United States Patent
Meadows

[15] 3,695,673
[45] Oct. 3, 1972

[54] AIR-FLOW DIVERTER FOR TRACTOR-TRAILER RIG

[72] Inventor: James H. Meadows, 113 Locust Ave., Spencer, W. Va. 25276

[22] Filed: Sept. 11, 1970

[21] Appl. No.: 71,469

[52] U.S. Cl. ................................................296/1 S
[51] Int. Cl. .................................................B60j 9/04
[58] Field of Search................................296/1 S, 91

[56] References Cited

UNITED STATES PATENTS

| 3,348,873 | 10/1967 | Saunders | 296/1 S |
| 2,914,231 | 11/1959 | Hornke | 296/91 X |
| 2,792,254 | 5/1957 | Hagglund | 296/91 |
| 3,484,130 | 12/1969 | Read | 296/1 S |

FOREIGN PATENTS OR APPLICATIONS 1,067,101  1/1954  France..........................296/91

Primary Examiner—Benjamin Hersh
Assistant Examiner—John A. Pekar
Attorney—William Cleland

[57] ABSTRACT

Air-flow diverter affixed on tractor cabin roof of tractor-trailer rig, is generally plow-shaped to present rearwardly divergent concave surfaces, lower portions of which are presented upwardly. Air-flow against forwardly moving rig is diverted to fan around the top and adjacent side edges of trailer, while air-flow resultantly applied against said upwardly presented lower portions applies downward steadying pressure against cabin roof, and thereby tending to amplify tractional capability of tractor.

3 Claims, 4 Drawing Figures

PATENTED OCT 3 1972　　　　　　　　3,695,673

INVENTOR.
James N. Meadows
BY William Cleland
Attorney

AIR-FLOW DIVERTER FOR TRACTOR-TRAILER RIG

BACKGROUND OF INVENTION

Heretofore tractor-trailer rigs on the highways were often difficult to handle due to strong wind currents striking directly against the forward wall of the trailer, particularly in the area extending above the tractor cabin roof. Prior attempts to divert the air-flow over the cabin roof have not been completely effective to reduce wind resistance applied against the forward wall of the trailer. In any event, known prior wind-diverters have tended to aggravate the condition by creating eddy currents between the tractor and the trailer.

SUMMARY OF INVENTION

In the present invention a generally plow-shaped air-flow diverting shield is rigidly affixed on the tractor cabin roof of a tractor-trailer rig. Divergent panels of the shield have forwardly presented concave surfaces, which diverge rearwardly of the tractor from a forward, generally vertical juncture line of the panels. Lower portions of said concave surfaces are flared or shaped to present substantial surface areas generally upwardly. Air-flow toward the forwardly moving tractor-trailer rig is deflected by the plow-shaped surfaces effectively to fan the diverted air outwardly and rearwardly around the top and side edges of the trailer. A substantial proportion of the diverted air-flow, however, applied against said lower portion of the opposite concave surfaces is resultantly effective to apply a substantial degree of downward pressure which is translated through the tractor to the wheels thereof to amplify the tractional capability of the tractor.

A general object of the invention is to provide a wind-deflector for a tractor-trailer rig which not only diverts the air-flow effectively to reduce wind resistance against forward movement of the rig, but which modifies the flow in a manner which increases the tractional power of the tractor under wind conditions which normally tends to reduce the tractional power of the tractor due to irregular tractional contact of the driving wheels with the road.

Other objects of the invention will be manifest from the following brief description and the accompanying drawings.

Figure 1:
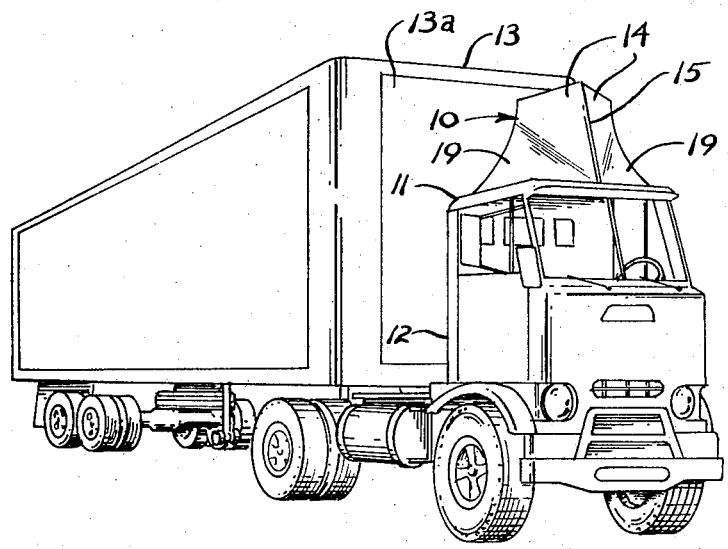
FIG. 1 is a perspective view of a tractor-trailer rig, as viewed generally toward the forward end thereof, and illustrating a wind-deflector of the present invention mounted on the cabin roof of the tractor.

Referring first to FIG. 1, there is illustrated a wind-deflector 10 of the present invention fixedly mounted upright, as shown, on the cabin roof 11 of a tractor 12 which is releasably attached to a trailer 13 of known box-like type in selectively spaced relationship to the front wall 13a of the trailer, in a manner to be described later.

Figure 2:
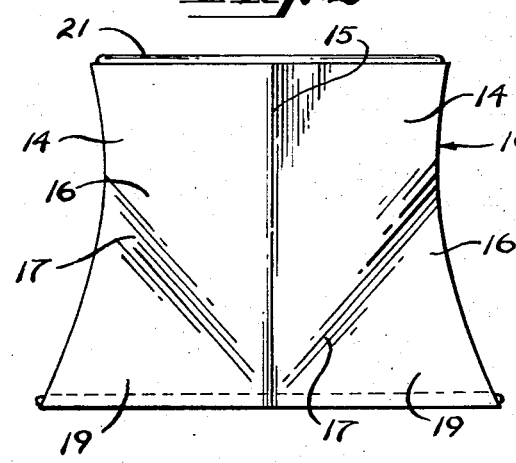
FIG. 2 is a front view, on a larger scale, of the wind-deflector shown in FIG. 1.
Figure 3:
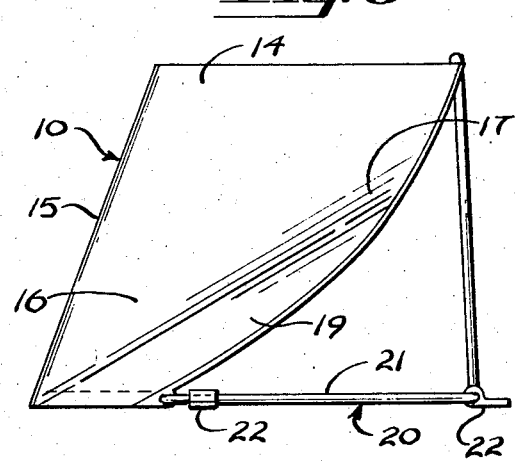
FIG. 3 is a side elevation of the wind-deflector as viewed from the right of FIG. 2, and on the same scale.

Referring now to FIGS. 2 and 3 in conjunction with FIG. 1, the deflector 10, in operational upright condition, as best shown in FIGS. 1 and 2, may be made of molded plastic or other rigid construction to have opposite side panels 14,14, diverging rearwardly from a vertical, forward line of juncture 15 between the two panels, and with concave faces or surfaces 16 of the panels forwardly presented, substantially in the shape of a plow and thereby adapted to cut sharply through the air-flow as the tractor-trailer rig 13 is in forwardly moving operational condition. The deeper portions of the opposite concavities 16 follow upwardly and outwardly divergent paths or valleys 17,17, extending from adjacent the lower end of juncture line 15, for diverting the air-flow which would otherwise impinge directly against the front wall 18 of the trailer, to fan the diverted air-flow outwardly and rearwardly around the top and side edges of the trailer adjacent the front wall 18 (see FIG. 1), with a minimum of resistance to the forward movement of the tractor-trailer rig. Substantial area extents 19 of the concave faces 16, at the lowermost portions of the same are somewhat flared out to be upwardly presented, whereby the aforesaid air-flow will, to a substantial degree, resultantly apply downward pressure to the flared portions 19, which downward pressure is in turn translated through the tractor body to the driving wheels of the tractor with resultantly increased tractional powers applied to the road.

The wind-deflector 10 may have a suitable rigid framework 20 anchored thereto, including a base frame 21 carrying a plurality of brackets 22 adapted to be bolted or otherwise secured to the cabin roof 11, in the upright condition of the deflector shown in FIG. 1.

Figure 4:
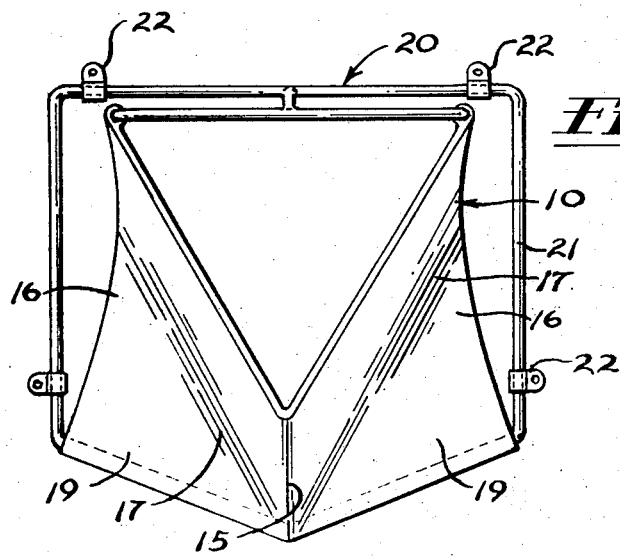
FIG. 4 is a top plan view of the wind-deflector shown in FIG. 2, and on the same scale.

Considering FIG. 1 in particular, in conjunction with FIGS. 2 to 4, when the tractor-trailer rig is driven against a relatively strong wind the air-flow impinging against the rearwardly divergent faces 14 of the relatively fixed wind-deflector 10, will be deflected upwardly and rearwardly along the divergent paths of valleys 17,17, of the opposite concavities 16 defined thereby, substantially uniformly to fan around the top and side edges of the forward wall 13a of the trailer 13. This substantially reduces the strong wind resistance which otherwise would be applied to said forward wall of the trailer to slow down the speed of the tractor-trailer rig. At the same time, downward wind pressure resultantly applied to substantial areas of the generally upwardly presented surfaces of the flared deflector portions 19 is effective to apply considerable downward pressure against the tractor cabin, which is in turn translated to the driven wheels of the tractor to increase the tractional power of said driven wheels against the road. In actual practice with use of the improved air-flow diverter on a tractor-trailer rig, notable improvements in the steadyness of operation of the tractor-trailer rig has been experienced, including a substantial reduction in shock-wave action, so annoying to motorists passing the space between tractor-trailer rigs of the type described, and not equipped with the air-flow deflector.

The improved air-flow diverter is shaped and proportioned so that a said diverter 10 of given size is capable of use with a wide range of tractor-trailer sizes and proportions in relation to the usual space between the back of the tractor cabin and the forward end of the trailer. Adjustment for maximum reduction of wind pressure against said forward end of the trailer can be readily accomplished by adjustment of base frame 21 on lugs 22 (see FIGS. 3 and 4), to vary the spacing of the converter 10 with reference to the trailer.

Modifications of the invention may be resorted to without departing from the spirit of the invention or the scope of the appended claims.

What is claimed is:

1. An air-flow diverter, for combination with a tractor-trailer rig of the type in which the tractor has a cabin roof positioned substantially lower than the top of a trailer having a front end of substantial broad lateral area, said air-flow diverter comprising: a generally plow-shaped shield including opposite side panels of substantial broad lateral area diverging rearwardly of a forward juncture line of the panels extending upwardly at an angle to the horizontal, and said side panels providing laterally opposite, forwardly presented concave surfaces each of substantial area defining valleys extending from a central point adjacent to the bottom of said shield and following inclined paths generally at a substantial angle to the horizontal; and means on said plow-shaped diverter for fixedly securing the same in upright condition on the cabin roof to have said concave surfaces spaced forwardly of the front wall of the trailer for diverting air-flow, otherwise tending to impinge directly against the same, to fan out in laterally opposite directions rearwardly along said valleys toward the sides of the trailer, and around the top of the trailer.

2. An air-flow diverter as set forth in claim 1, wherein upwardly presented lowermost surface portions of said valleys are of substantial area, whereby pressure of diverted air-flow resultantly applied against said lowermost portions tend to apply substantial downward pressure against said cabin roof.

3. An air-flow diverter as set forth in claim 2, wherein said lowermost surface portions are of such areas that the pressure of diverted air-flow resultantly applied against the same will tend to apply substantial downward pressure against said cabin roof tending to amplify the tractional capability of the tractor.

* * * * *